Patented Sept. 19, 1944

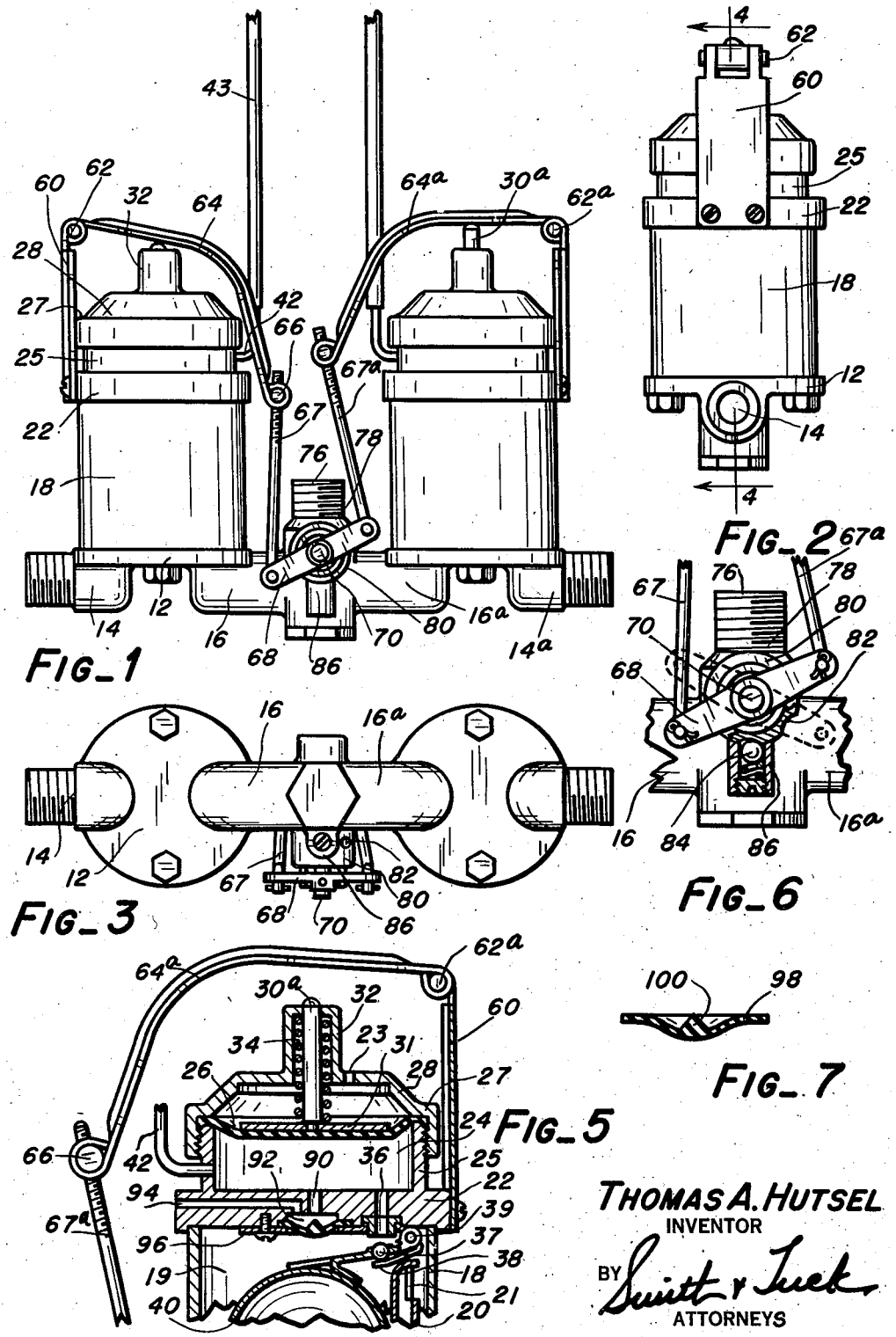

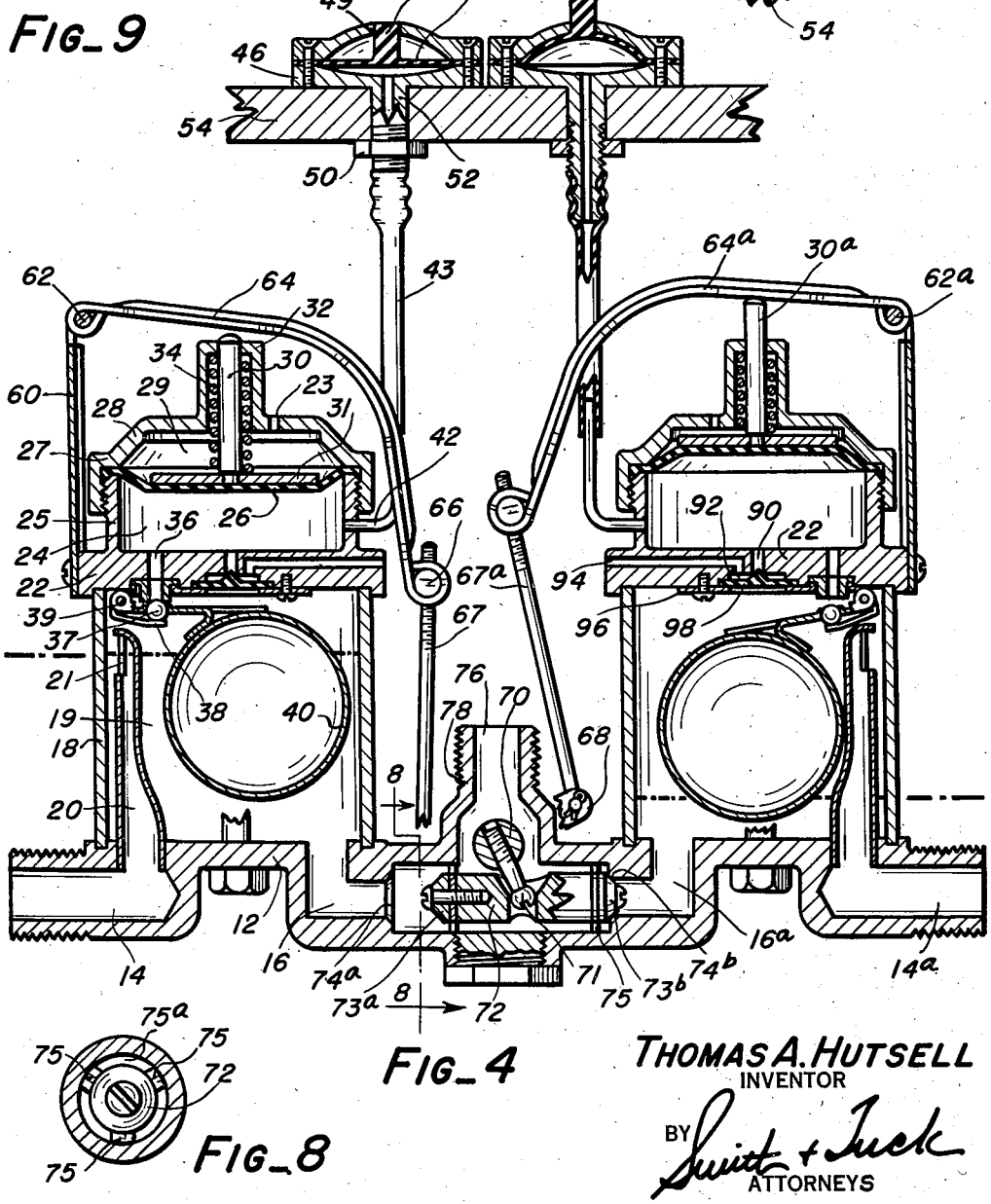

2,358,512

UNITED STATES PATENT OFFICE 2,358,512

MEANS FOR DISPENSING EFFERVESCENT FLUIDS

Thomas A. Hutsell, Seattle, Wash.

Application September 30, 1941, Serial No. 412,990

6 Claims. (Cl. 225—9)

My invention pertains to a means for dispensing effervescent fluids and more particularly relates to the attaching of containers of effervescent fluids to a dispensing spigot and automatically maintaining the uninterrupted flow of liquids under pressure from successive containers.

In methods now in common use for drawing beer, the fluid in the keg is maintained under gas or air pressure to prevent the $CO_2$ gas in the beer from separating. This pressure also serves to force the beer through a dispensing tube to a spigot. When the supply of beer in the keg is exhausted the dispensing tube will customarily be full of air and foamy beer under pressure and subsequently, if the air or gas pressure is taken off the keg, and the empty keg is removed, the pressure in the dispensing tube drops to atmosphere.

At such time as the empty keg is replaced with a full one and the air or gas pressure to the keg is re-established, the valve in the tap rod opened to the dispensing tube, beer under pressure is forced to flow into a dispensing tube which contains air and foam at atmospheric pressure. This produces a rapid influx of beer into the dispensing tube until the pressure throughout the system is uniform. This momentarily rapid flow causes "wire drawing" and aeration of the beer and when the spigot is opened to dispense the fluid, the air under pressure in the dispensing line is released allowing another momentary drop of pressure on the beer in the dispensing system, causing additional foam to form. Thus, all air and "wire drawn" or aerated beer must be exhausted until a "solid" stream of beer is established from the keg to the spigot before beer can be drawn without excessive foaming. This produces a wastage of beer and a considerable loss of time whenever an exhausted keg is replaced.

To meet and correct the above stated trouble, I have devised a method and means to which two or more tapped kegs are attached but with only a single dispensing tube. This invention is so arranged that the dispensing line constantly remains full of beer and is so that beer is drawn from only one of the tapped kegs until that source is exhausted, at which time the dispensing tube may be automatically connected with a second tapped keg without allowing air to enter the dispensing tube or the pressure to drop on the beer in the tube, without causing interruption in the flow of beer in the dispensing spigot.

When a subsequent keg is tapped, the air trapped in the tap rod beer hose and the control chamber of my device, is automatically vented to the atmosphere and is replaced with beer, under pressure, ready to automatically establish a further uninterrupted flow of beer under pressure from the auxiliary keg to the dispensing tube when the supply is exhausted from the first keg.

This device also permits the replacement of the exhausted first keg at any time before the second keg is exhausted. The only time air enters the dispensing tube is when the system is being cleaned by conventional methods, in some of which the dispensing tube remains full of water that may be drawn off ahead of the beer.

My invention may be provided with indicators that show when a keg is exhausted of beer and indicates which keg to replace.

It is obvious that this device will permit continuous drawing of any number of kegs of beer from one cleaning period to the next, and that exhausted kegs may be replaced with full ones at the convenience of the operator.

These and other objects and advantages of the invention will be more apparent during the course of the following description, wherein I have described the preferred embodiment of my invention illustrated in the attached drawings forming a part of this specification.

While these drawings show and this specification describes such preferred embodiment, it is specifically pointed out that changes and alterations may be made in the shape and parts of the invention without departing from its spirit and scope as defined by the subjoined claims:

In the drawings:

Figure 1 is a face view of the cut-in mechanism of my invention,

Figure 2 is a side view of the same mechanism,

Figure 3 is a bottom plan view as though looking up in the showing of Figure 1,

Figure 4 is an enlarged vertical, sectional view taken on the plane of the line 4—4 of Figure 2, Figure 5 is a fragmentary sectional view showing a portion of the mechanism of Figure 4, with the parts in alternative positions, Figure 6 is a fragmentary view, with portions in section, of the cut-over valve and its operating means employed in my invention, Figure 7 is a sectional view of a flexible valve element used in my device, Figure 8 is a detailed sectional view taken on lines 8—8 of Figure 4, Figures 9 and 10 are, respectively, face and side views of an indicator member employed in my device.

My invention comprises a base member 12 having an inlet conduit 14 and an outlet conduit 16 associated therewith so that a cylindrical wall 18, supported above the base, can be supplied with and exhausted of fluids passing through the conduit. Above the discharge port of the inlet conduit is the riser tube 20 that is ported in its upper end at 21 to permit the flow of liquid introduced thereto through the conduit 14 at an upper level of the chamber 19 formed within the wall 18.

A head 22 covers the upper end of the cylindrical wall 18 to close the chamber formed therein. Head 22 has, on its upper face, the chamber 24 comprising the wall 25 and the flexible diaphragm 26. The diaphragm is retained in position by the flange 27 of the crowned cover 28. Thus it can be seen that in a single unit a pair of chambers may be provided and arranged in juxtaposition.

A chamber 29 is provided above the diaphragm 26 by reason of the space under the crowned cover 28 and this chamber is vented to the atmosphere through port 23. This chamber provides working space for the diaphragm. A shaft 30 is connected to a plate 31 attached to the diaphragm and extends upwardly through guide collar 32 and is encircled by spring 34 to impart a normal downward urgence to distend the diaphragm 26, into chamber 24. The stem 30 extends through the member 32 and on occasion, as can be seen on the right side of Figure 4, will be extended some distance therefrom to operate a leverage mechanism in a manner and for a purpose to be described.

Chamber 19, formed within wall 18, is in communication with chamber 24 through the duct 36 but communication through this passage may be limited by a ball or pilot valve 37 that is positioned in the lower or adit end of the passage 36. Lever 38, swings about the pivot 39, under the upward or downward urgence of the float 40 and carries the pilot valve 37. When there is sufficient liquid present within the chamber 19 to raise the float to the floating position, indicated in the left side of Figure 4, the duct 36 is closed by valve 37 to prevent communication between chambers 19 and 24.

A tube 42, in communication with the interior of the chamber 24, connects to the conduit 43, to convey fluid pressures from the chamber 24 to the under side of the indicator diaphragm 45 mounted in the housing 46 for flexing movement. On diaphragm 45 is a boss 48 that, at times, is extended through the opening 49 in housing 46.

A nut 50 on the tubular shank 52 associated with housing 46 secures the member to a structural member 54 at any convenient location for the purpose of displaying a signal, effected at certain times by the protrusion of boss 48 from housing 46.

A leg 60 provides a journal for pin 62 and the curved lever 64, which is disposed in the path of the diaphragm shank 30, is pivoted thereto.

The crosspin 66 on the free end of lever 64 is threaded on a draw bar 67, which is connected with the actuator lever 68 of a toggle valve. In the drawings, where a pair of units are associated together, a second draw bar 67a is attached to the opposite end of lever 68.

The valve, indicated as a whole by numeral 78, comprises the shaft 70, the throw pin 71, and slidable valve member 72 that has a valve face 73a and a valve face 73b to close or open the seat 74a or 74b in the discharge passages 16 or 16a to permit or retard the flow of liquid from chambers 19 to the discharge outlet 76 of the valve housing 78.

It will be seen that when two chambered units are coupled to a single header valve, the oscillating valve member alternately seats in one or the other discharge outlets depending upon which chambered unit provides the motivating energy.

A ring 80 carried by the lever 68 is notched as at 82 and is retained in one adjusted position or the other by means of the spring pressed detent or ball 84 in the housing 86. Rocking movement of the lever 68 is thus restricted, to a degree, until the pressure of the spring-pressed detent 84 on the ring 80 is overcome. At that time the alternate notch 82 will be presented to the detent and the lever will be held in that adjusted position it assumes.

The cylinder head 22 is provided with a secondary vent port 90 into the exhaust chamber 92 from which vent passage 94 extends to the outerface of the head. The chamber 92 may be formed by counterboring the under side of the head 22 and seating therein, by a washer 96, the flexible disc valve member 98.

Disc valve 98 of the nature of a diaphragm has a central pointed valve tip 100 for closing the opening 90. Under atmospheric pressure the valve member 98, being biased to the open position, permits free communication between port 90 and passage 94 through the chamber 92. Pressure on the underside of the valve member 98 will force the tip 100 into engagement with one side of the port 90 and close it thus cutting off communication from that point to the passage 94 and the outer atmosphere. In Figure 5 the valve member 98 is shown in the open position and in Figure 4 (both showings) it is indicated as being closed to seal the port.

The foregoing description largely relates to a single valve operating mechanism. In such a case the device, when it operates, merely abates the further flow of an effervescent fluid through to its ultimate dispensing point as at a spigot when a keg is evacuated. When the device operates the valve member 72 closes so that it seats its face 73a against the seat 74a and further flow is thus impeded until a new keg of beer is attached to the line 14 and made ready to be dispensed.

In certain instances it is desirable to not only cut off the evacuated keg but also to cut into the dispensing system a full and unused keg automatically and without interruption of the flow. My invention operates ideally under such conditions.

Throughout the drawings and as has been described, it will be seen that the valve control may be arranged in pairs to oscillate and operate a single valve member as 72 having a plurality of valve faces 73a and 73b to alternately close seats 74a or 74b as occasion requires.

As shown in Figure 4, and also in Figure 1, a pair of units are arranged side by side, each having its inlet conduit associated with a separate source of fluid as for example a beer keg. Each such unit will have its discharge conduit associated with a single valve housing 78. In such installations the valve member 72 has a plurality of valve faces 73a and 73b each to close at one end of its reciprocating travel on a valve seat 74a or 74b. Adjacent each valve face the member 72 is provided with a star washer having a plurality of fingers 75 which have a radius substantially equal to the radius of the cylindrical passage in which the member 72 slides. These fingers serve to guide the member. Fluid flows through the spaces 75a between the arms of the star washer in the cylindrical passage and out through the discharge passage of the valve housing 78.

In this installation, a second keg is attached to the feed or inlet attached to conduit 14a in the same manner in which a keg is attached to the conduit 14.

Method of operation

The fragmentary sectional showing of Figure 5 indicates the "at rest" position assumed by the parts of a control unit of my invention. When the device is at rest and there is no gas or air pressure of any kind whatsoever applied to the inlet tube 14, the valve 98 is in the open position. Pointed end 100 is unseated from the mouth of port 90 permitting free access from the chamber 24 through passage 90, chamber 92 and the bleeder passage 94 to the outside atmosphere. In such a case, when there is an absence of any pressure in the chamber 24, the diaphragm 26 is extended downwardly into the chamber under the urgence of the spring 34 encircling pins 30 or 30a as the case may be.

In an empty chamber, due to the lack of liquid having a buoyancy sufficient to float the member 40, the pilot valve 37 is permitted to fall away from its seat at the lower end of duct 36, consequently there is free communication from the chamber 19 through the duct 36 to chamber 24.

Similarly the indicator diaphragm 45 of the member 46 is in the "at rest" position with the protuberance 48 withdrawn into the housing 46.

Let it be assumed that a keg of beer is joined to the passage 14 or 14a. Ordinarily, at such times, auxiliary air or gas pressure is applied to the keg to force the beer therefrom through the dispensing conduit. This pressure serves not only to convey the liquid but also to retard its effervescing and limit the freeing of the volatile carbon dioxide gas ($CO_2$) from the beer.

The conduit leading to the control unit, as well as the control unit itself, will naturally be filled with air. This air is driven out of the conduit and through the unit by the flow of the beer under pressure. Because the small initial amount of inflowing foam does not have buoyancy to float the member 40, as it enters the chamber 19 through the tube 20 at an upper level, air displaced from chamber 19 passes outwardly therefrom through the duct 36, through chamber 24, out the port 90, through the chamber 92, and to the atmosphere through the bleeder or vent opening 94. There will be an equal pressure on either side of the member 98 and consequently the valve will remain in the position shown in Figure 5 and, as well, will the diaphragms 26 and 45 remain at rest.

As the flow of liquid entering the chamber 19 becomes sufficient to float the member 40, the pilot valve or ball 37 rises to close the duct 36 and the pressure built up within the chamber immediately closes the passage 90 due to the upward flexing of member 98 because of pressure against its relatively large exposed lower face.

Any air that is trapped between the chamber 19 and the tap faucet connected with the outlet 76 of housing 78 will be vented through the dispensing tap.

Beer will flow through the chamber 19 in a continuous manner as it is drawn out from the dispensing tap without further action of the parts of the control unit so long as there is sufficient liquid in the chamber 19 to maintain float 40 in its upper position.

As the keg is depleted of its contained liquid and its flow diminishes through the chamber 19, the float 40 drops and opens the passage 36. Pneumatic pressure contained within the upper portion of chamber 19, above the fluid level, escapes through duct 36 and acts upon the lower side of diaphragm 26 to overcome the urgence of spring 34. This action extrudes the pin 30 outwardly from the housing 28 and against the pivoted lever 64.

This action is suggested in the right side of Figure 4, where the lever 64a has been raised to its upper position imparting a pull upon the draw bar 67a to swing arm 68 about its pivotal axis causing the pin 71 to urge the valve face 73b against the valve seat 74b. As described above this action is slightly retarded by the detent 84 until the force of its spring is overcome, at which time the lever "snaps" over to its alternative position. Further flow of liquid from within the chamber 19 is thus stopped.

The action is so rapid that a quantity of liquid is trapped within the chamber 19 and no foam enters the valve housing or dispensing line to the dispensing tap.

At the same time that pressure escapes into the chamber 24 it is conducted, by means of tube 43, to a diaphragm 45. This distends the diaphragm as shown on the right side in Figure 4, causing the indicator protuberance 48 attached to diaphragm 45, to extend from the casing as a means of indicating that the keg to which that unit is attached has been evacuated.

When two such units are tied together in the operation of a single valve, the closing of the dispensing outlet of the right chamber will automatically result in the opening of the left control unit permitting the flow of beer, that may be in a keg connected thereto, to the dispensing spout in the normal and above described manner.

When a keg is evacuated and air pressure or gas pressure escapes from the chamber 19 into the chamber 24, there is no action of the valve 98 associated with that particular unit because the portion of the exposed face on the lower side of the valve is greater than the exposed portion under pressure in the chamber 24 which is the tip point 100. Although the valve is normally biased to the open position the pressure contained in chamber 19 will maintain it in its closed position and prevent any bleeding of the air pressure.

When the conduit from the keg to the inlet opening 14 or 14a is disjointed and the contained pressure dispelled, pressure within chambers 19 and 24 drop to atmospheric level permitting the diaphragms 45 and 26, and the valve 98, to assume their normal or "at rest" position.

The quantity of fluid trapped within the chamber 19 is prevented from escaping by reason of the fact that the inlet tube 20 rises a substantial distance in the chamber 19 and prevents any back flow. Valve member 73b maintains the liquid seal that has above been described at the valve seat 74b. A second keg can be joined to the member 14a and it will be reinstated, in operating condition, in the usual manner.

I claim:

1. A beer dispensing device having two supply conduits adapted to feed into a header, a valve for controlling the flow of beer from one or the other of said conduits into said header, and means for actuating said valve in response to a change in the relative amount of gas and beer in one of said conduits to close such conduit and open the other.

2. A beer dispensing device, comprising: a beer supply header; two beer supply conduits adapted to supply beer to said header; a valve for controlling the flow of beer from one or the other of said conduits into said header, means associated with each conduit for actuating said valve in response to a change in the relative amount of gas and beer in one of said conduits to close such conduit and open the other and a loose link interposed between each of said means and said valve whereby said means can actuate said valve by movement in one direction only.

3. A beer dispensing device, comprising: a beer conduit for the conduct of beer under pressure; a float chamber adapted to be related to said conduit to hold beer from said conduit and to trap gas passing through said conduit; a valve for closing said conduit; an expansible chamber for actuating said valve; associated with said float chamber a venting port and duct to said expansible chamber; closures for said port and duct; and float means placed in said float chamber and controlling the operation of said closure; the area of said venting closure being such that when closed a pressure in said float chamber above that outside said port will maintain said port closed, and the operation of said float means being such that as the beer level rises in said chamber it will actuate said closures to close said port and duct, the subsequent fall of the liquid level opening said duct to said expansible chamber, and the expansion of said chamber actuating said valve to close said conduit.

4. A beer dispensing device, comprising: a beer conduit for the conduct of beer under pressure; a valve for closing said conduit; a float chamber adapted to be related to said conduit, to hold beer from said conduit, and to trap gas passing through said conduit; an expansible chamber for actuating said valve; a duct connecting said float chamber and said expansible chamber; a venting port leading from said expansible chamber; closures for said duct and port, said closure for said venting port being operative to close said port upon establishment of a differential in pressure between said float chamber and the outlet side of said port; a float placed in said float chamber and controlling the operation of said duct closure; the operation of said float being such that as the beer level rises in said chamber said float will rise and actuate said duct closure to close said duct whereby there will be established a differential in pressure between said float chamber and the outlet side of said port to close said venting port, and a subsequent fall of the liquid level in said float chamber will open the duct between said chambers which will cause an expansion of said expansion chamber to actuate said valve.

5. A beer dispensing device, comprising: a beer conduit for the conduct of beer under pressure; a valve for closing said conduit; a float chamber adapted to be related to said conduit, to hold beer from said conduit, and to trap gas passing through said conduit; an expansible chamber for actuating said valve; a duct connecting said float and expansible chambers; a venting port leading from said expansible chamber; closures for said duct and port, the closure for said port being operated by a pressure actuated disk interposed between said float chamber and the outlet side of said venting port, said disk being biased toward said float chamber, and being operative to close said port upon establishment of a differential in pressure between said float chamber and the outlet side of said port; and a float placed in said float chamber to control the operation of said duct closure; the operation of said float being such that as the beer level rises in said chamber said float will rise and actuate said duct closure to close said duct whereby there will be established a differential in pressure between said float chamber and the outlet side of said port to close said venting port, and a subsequent fall of the liquid level in said float chamber will open said duct, which will cause an expansion of said expansion chamber to actuate said valve.

6. A beer dispensing device, comprising: a beer supply header; two beer supply conduits adapted to carry beer under pressure and to supply it to said header; a valve for controlling the flow of beer from one or the other of said conduits into said header; a float chamber adapted to be related to each of said conduits, to hold beer from its respective conduit, and to trap gas passing through such conduit; and each float chamber having associated therewith: an expansible chamber for actuating said valve; associated with said float chamber a venting port and a duct to said expansible chamber; closures for said port and duct; and float means placed in said float chamber and controlling the operation of said closures; said venting closure when closed remaining closed as long as the pressure in said float chamber is above that outside said port, the operation of said float means being such that as the beer level rises in said chamber it will actuate said closures to close said port and duct, the subsequent fall of the liquid level opening said duct to said expansible chamber, and the expansion of said chamber actuating said valve to close said conduit; and a loose link between said expansible chamber and said valve whereby contraction of said chamber will not operate said valve.

THOMAS A. HUTSELL.